(12) United States Patent
Radha et al.

(10) Patent No.: US 11,790,542 B2
(45) Date of Patent: Oct. 17, 2023

(54) MAPPING AND LOCALIZATION SYSTEM FOR AUTONOMOUS VEHICLES

(71) Applicant: Board of Trustees of Michigan State University, East Lansing, MI (US)

(72) Inventors: Hayder Radha, East Lansing, MI (US); Daniel Morris, Okemos, MI (US); Su Pang, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 34 days.

(21) Appl. No.: 17/627,220

(22) PCT Filed: Jul. 29, 2020

(86) PCT No.: PCT/US2020/043964
§ 371 (c)(1),
(2) Date: Jan. 14, 2022

(87) PCT Pub. No.: WO2021/021862
PCT Pub. Date: Feb. 4, 2021

(65) Prior Publication Data
US 2022/0270268 A1    Aug. 25, 2022

Related U.S. Application Data

(60) Provisional application No. 62/879,854, filed on Jul. 29, 2019.

(51) Int. Cl.
*G06T 7/246* (2017.01)
*G06V 10/77* (2022.01)
(Continued)

(52) U.S. Cl.
CPC ............ *G06T 7/248* (2017.01); *G06V 10/764* (2022.01); *G06V 10/7715* (2022.01);
(Continued)

(58) Field of Classification Search
CPC ........... G06T 7/248; G06T 2207/10028; G06T 2207/30252; G06V 10/764;
(Continued)

(56) References Cited

U.S. PATENT DOCUMENTS

| 8,229,222 B1 * | 7/2012 | Silver | G06V 10/469 |
| | | | 382/209 |
| 2013/0300740 A1 * | 11/2013 | Snyder | G06T 17/00 |
| | | | 345/419 |

(Continued)

OTHER PUBLICATIONS

Tongtong Chen et al., "Velodyne-based Curb Detection Up to 50 Meters Away". IEEE Intelligent Vehicles Symposium (IV), Jun. 28-Jul. 1, 2015. COEX, Seoul, Korea.

(Continued)

*Primary Examiner* — John B Strege
(74) *Attorney, Agent, or Firm* — Harness, Dickey & Pierce PLC

(57) ABSTRACT

Accurate vehicle localization is arguably the most critical and fundamental task for autonomous vehicle navigation. While dense 3D point-cloud-based maps enable precise localization, they impose significant storage and transmission burdens when used in city-scale environments. A highly compressed representation for LiDAR maps, along with an efficient and robust real-time alignment algorithm for on-vehicle LiDAR scans, is proposed here. The proposed mapping framework, requires less than 0.1% of the storage space of the original 3D point cloud map. In essence, mapping framework emulates an original map through feature likelihood functions. In particular, the mapping framework models planar, pole and curb features. These three feature classes are long-term stable, distinct and common among vehicular roadways. Multiclass feature points are extracted from LiDAR scans through feature detection. A new multiclass-based point-to-distribution alignment method is also (Continued)

proposed to find the association and alignment between the multiclass feature points and the map.

15 Claims, 8 Drawing Sheets

(51) Int. Cl.
*G06V 10/764* (2022.01)
*G06V 20/56* (2022.01)

(52) U.S. Cl.
CPC .... *G06V 20/56* (2022.01); *G06T 2207/10028* (2013.01); *G06T 2207/30252* (2013.01)

(58) Field of Classification Search
CPC ............... G06V 10/7715; G06V 20/56; G01C 21/3848; G01C 21/387
See application file for complete search history.

(56) References Cited

U.S. PATENT DOCUMENTS

| | | | | |
|---|---|---|---|---|
| 2017/0343356 | A1* | 11/2017 | Roumeliotis | H04W 4/027 |
| 2018/0232947 | A1* | 8/2018 | Nehmadi | G01S 7/295 |
| 2020/0364883 | A1* | 11/2020 | Hoffmann | G06T 7/74 |
| 2023/0075959 | A1* | 3/2023 | Liu | G11C 7/1093 |

OTHER PUBLICATIONS

Robert Spangenberg, Daniel Goehring, Raul Rojas, "Pole-based Localization for Autonomous Vehicles in Urban Scenarios". IEEE/RSJ International Conference on Intelligent Robots and Systems (IROS). Daejon Convention Center, Oct. 9-14, 2016, Daejon, Korea.
Philipp Ruchti et al., "Localization on OpenStreetMap Data using a 3D Laser Scanner". IEEE International Conference on Robotics and Automation (ICRA). Washington State Convention Center, Seattle, Washington, May 26-30, 2015.

* cited by examiner

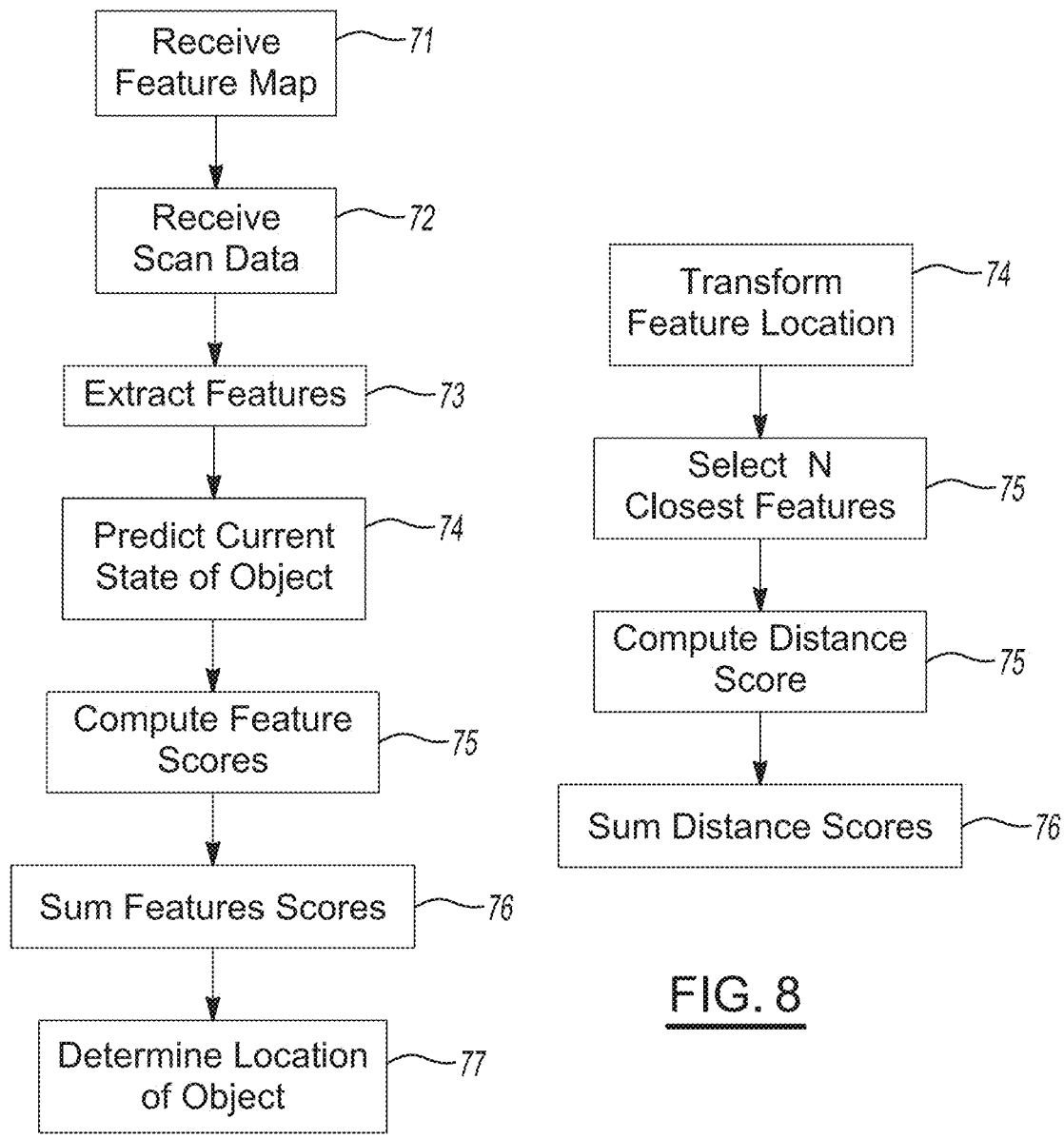

| Experiment Type | Map Type | LiDAR Data | Exp #1 (5 ~ 10mph) | | | | Exp #2 (15 ~ 20mph) | | | | Exp #3 (25 ~ 30mph) | | | |
| | | | Test Site #1 | | Test Site #2 | | Test Site #1 | | Test Site #2 | | Test Site #1 | | Test Site #2 | |
| | | | Pos | Yaw | Pos | Yaw | Pos | Yaw | Pos | Yaw | Pos | Yaw | Pos | Yaw |
|---|---|---|---|---|---|---|---|---|---|---|---|---|---|---|
| Single-Step Alignment | 3D Point Cloud | LiDAR Scans | 4.05 | 0.29 | 7.13 | 0.35 | 5.10 | 0.42 | 7.58 | 0.38 | 5.02 | 0.41 | 6.31 | 0.45 |
| | Non-Class FLM | 2D LiDAR Scans | 17.83 | 1.58 | 22.83 | 2.04 | 19.47 | 1.75 | 21.39 | 1.99 | 20.17 | 1.69 | 20.83 | 2.16 |
| | Non-Class FLM | Non-class Feature Points | 12.54 | 0.92 | 10.37 | 0.88 | 14.52 | 1.36 | 11.35 | 0.95 | 14.10 | 1.13 | 12.94 | 1.03 |
| | FLAME Map | Multiclass Feature Points | 8.23 | 0.577 | 7.45 | 0.46 | 8.10 | 0.62 | 7.93 | 0.59 | 8.31 | 0.49 | 7.96 | 0.61 |
| Overall Localization | 3D Point Cloud | LiDAR Scans | 4.06 | 0.34 | 7.42 | 0.40 | 5.42 | 0.46 | 7.61 | 0.40 | 5.14 | 0.46 | 6.83 | 0.48 |
| | FLAME Map | Multiclass Feature Points | 8.76 | 0.92 | 8.15 | 0.46 | 8.31 | 0.86 | 9.47 | 0.61 | 9.13 | 0.79 | 8.75 | 0.64 |

FIG. 9

MAPPING AND LOCALIZATION SYSTEM FOR AUTONOMOUS VEHICLES

CROSS-REFERENCE TO RELATED APPLICATIONS

This application is a 371 U.S. National Stage of International Application No. PCT/US2020/043964, filed Jul. 29, 2020, which claims priority to U.S. Provisional Application No. 62/879,854, filed on Jul. 29, 2019. The entire disclosures of the above applications are incorporated herein by reference.

FIELD

The present disclosure relates to constructing a two-dimensional feature likelihood map and localization of an autonomous vehicle using the same.

BACKGROUND

A fundamental task for autonomous vehicles is to accurately determine its position at all times. Multiple key sub-systems rely either fully or partially on the performance of the localization algorithm. It has been estimated that decimeter level localization accuracy is required for autonomous vehicles to drive safely and smoothly. GNSS-based (Global Navigation Satellite System) techniques struggle to achieve this level of accuracy except for open sky areas. Map-based localization frameworks, especially those that utilize Light Detection and Ranging (LiDAR) based localization methods, are popular because they can achieve centimeter level accuracy regardless of light conditions. However, a key drawback of any localization method that relies on 3D point-cloud maps is the enormous size of the map itself. Consequently, there is a need for efficient representations of such maps while maintaining high-accuracy localization capabilities. The representation format should contain sufficient information for vehicles to localize and be lightweight (i.e., low storage) enough to be stored and downloaded into vehicles in real-time when needed. Furthermore, it is important to note that environments do change rather frequently, and it is therefore important to have the ability to update the map to reflect these changes.

In this disclosure, a low memory storage map-based localization framework is presented and referred to herein as Feature Likelihood Acquisition Map Emulation (FLAME). FIG. 1 shows an overview of the proposed system architecture. From the map point of view, instead of being represented as a 3D point cloud, compressed and lightweight features are used to represent the environment. The FLAME system emulates an original map through feature likelihood function. The size of the final FLAME map is often under 0.1% of the original point cloud. In order to align the real-time LiDAR scan to the features for localization, corresponding features are extracted in real-time from the scan through feature detection. Experimental results show that the proposed method can achieve comparable centimeter level localization accuracy to the traditional dense 3D point cloud based methods.

This section provides background information related to the present disclosure which is not necessarily prior art.

SUMMARY

This section provides a general summary of the disclosure, and is not a comprehensive disclosure of its full scope or all of its features.

In one aspect, a method is provided for constructing a two-dimensional feature map of a scene. The method includes: receiving point cloud data for a scene; projecting pixels in the point cloud data into an x-y plane, where the x-y plane is substantially parallel with ground in the scene; dividing the x-y plane into an array of cells; classifying one or more in the array of cells as potential feature candidate cells; generating line segments by connecting cells in the array of cells which are classified as potential feature candidate cells; designating each line segment as a feature in the scene; representing each feature in the scene with an approximation function; and for each feature, storing the approximation function assigned to a given feature, along with a global coordinate for the given feature, in a non-transitory data store, thereby constructing a feature map of the scene.

Before projecting the pixels in the point cloud data into an x-y plane, a first set of pixels may be extracted from the point cloud data, where the pixels in the first set of pixels represent the ground in the scene.

In one embodiment, line segments are generated using Random Sample Consensus method. Line segments may be designated as one of a curb feature, a planar feature or a pole feature. Representing a given feature in the scene with an approximation function further includes computing a mean value and a covariance matrix for the given feature, where the mean value is a center point of the line segment associated with the given feature.

In another aspect, a computer-implemented method is provided for determining location of a moving object in a scene. This method includes: receiving a feature map of the scene, where each feature in the feature map includes coordinates for the feature in a two-dimensional (2D) coordinate system representing the scene; receiving, from a 3D scanner, three-dimensional scan data of a scene surrounding the moving object; extracting two or more features from the three-dimensional scan data; receiving a previous motion state for the moving object, where the motion state includes coordinates of the moving object in the 2D coordinate system associated with the feature map; predicting a current state of the moving object in the 2D coordinate system associated with the feature map using the previous motion state and a motion model; computing a distance score for each feature of the two or more features; summing the distance scores for each of the two or more features to yield an alignment score; and determining location of the movable object in the 2D coordinate system associated with the feature map by minimizing the alignment score.

A distance score for a given feature may be computed by: a) transforming a location for a given feature in the two or more features from a coordinate system associated with the 3D scanner to a location in the 2D coordinate system associated with the feature map; b) selecting N features in the feature map having closest proximity to the location of the given feature in the 2D coordinate system; c) computing a distance score between the given feature and each of the selected N features; d) summing the distance scores between the given feature and each of the selected N features to yield a distance score for the given feature.

The three-dimensional scan data may be captured using the 3D scanner, for example where the 3D scanner is integrated with the moving object.

In one embodiment, each feature in the feature map is represented with a Gaussian-based approximation function and the distance score between the given feature and each of the selected N features is computed based on a Mahalanobis distance.

The overall alignment score may be minimized over multiple iterations until a stopping condition is met. In the example embodiment, the overall alignment score is minimized using Newtons method.

In some embodiments, each of the two or more features are classified into one of a predetermined set of feature types. For each feature type in the predefined set of feature types, a feature type score for a given feature type is computed. The feature type score may be computed by: e) transforming a location for a given feature from a coordinate system associated with the 3D scanner to a location in the 2D coordinate system associated with the feature map, where the given feature has same feature type as the given feature type; f) selecting N features in the feature map having closest proximity to the location of the given feature in the 2D coordinate system, where the selected N features are same feature type as the feature type of the given feature; g) computing a distance score between the given feature and each of the selected N features; and h) summing the distance scores for each of the selected N features to yield a distance score for the given feature. Steps e)-h) are repeated for each of the features belonging to the given feature type and the distance scores for each of the features belonging to the given feature type are summed to yield a feature type score. Then, the feature type scores for each of the feature types in the predefined set of feature types are summed to yield an overall alignment score.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a flowchart depicting a method for determining the location of a moving object or vehicle.

FIG. 8 is a flowchart further illustrating how to compute a distance score for a feature.

FIG. 9 is a table comparing position estimation error and orientation error between the proposed localization method and other methods.

Corresponding reference numerals indicate corresponding parts throughout the several views of the drawings.

DETAILED DESCRIPTION

Example embodiments will now be described more fully with reference to the accompanying drawings.

Figure 1:
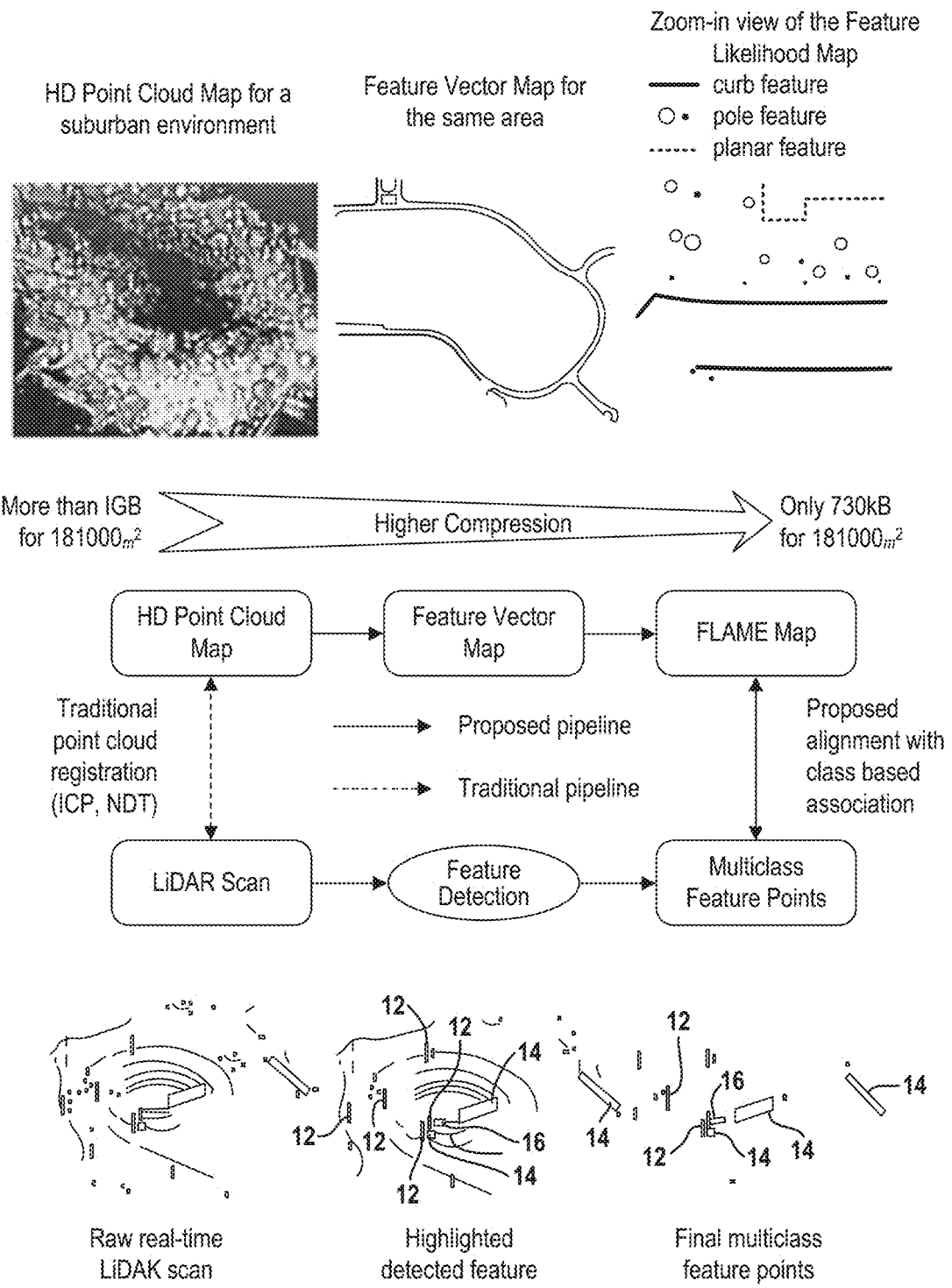
FIG. 1 is an overview of a proposed 2D feature likelihood map-based localization architecture.

FIG. 1 shows the overview of the system architecture and dataflows. The solid lines in the figure describe the proposed pipeline. In the map-construction stage, multiple classes of features, including a subset of planar, pole and curb features, are extracted from the original point cloud map and make up the feature vector map. Then, the proposed feature likelihood (or FLAME) map is generated to model both the feature locations, shapes and uncertainties. During runtime, the same classes of features are extracted from the real-time LiDAR scans by the feature detection algorithm. A proposed multiclass based association alignment algorithm is used to align these multiclass feature points with the FLAME map, and in so-doing achieve localization.

In the example embodiment, a three-class feature set is used to represent common environments around vehicular roadways. The feature set is chosen so that features are common and broadly representative, as well as being discriminative and readily localized. In this example, the three features are pole features 12, planar features 14, and curb features 16. Planar features include walls, building facades, fences, signs with large boards, and other planar surfaces. Pole features include the pole part of streetlights, traffic signs, tree trunks and similar vertical shapes. Finally, curb features discretely sample curbs. Each of these feature types is easily detected in LiDAR scans, even for low resolution LiDAR, and can be modeled by simple geometric entities, as described below. Additional features or fewer than these three features may be used in the alignment stage. Other types of features are also contemplated by this disclosure.

Figure 2:
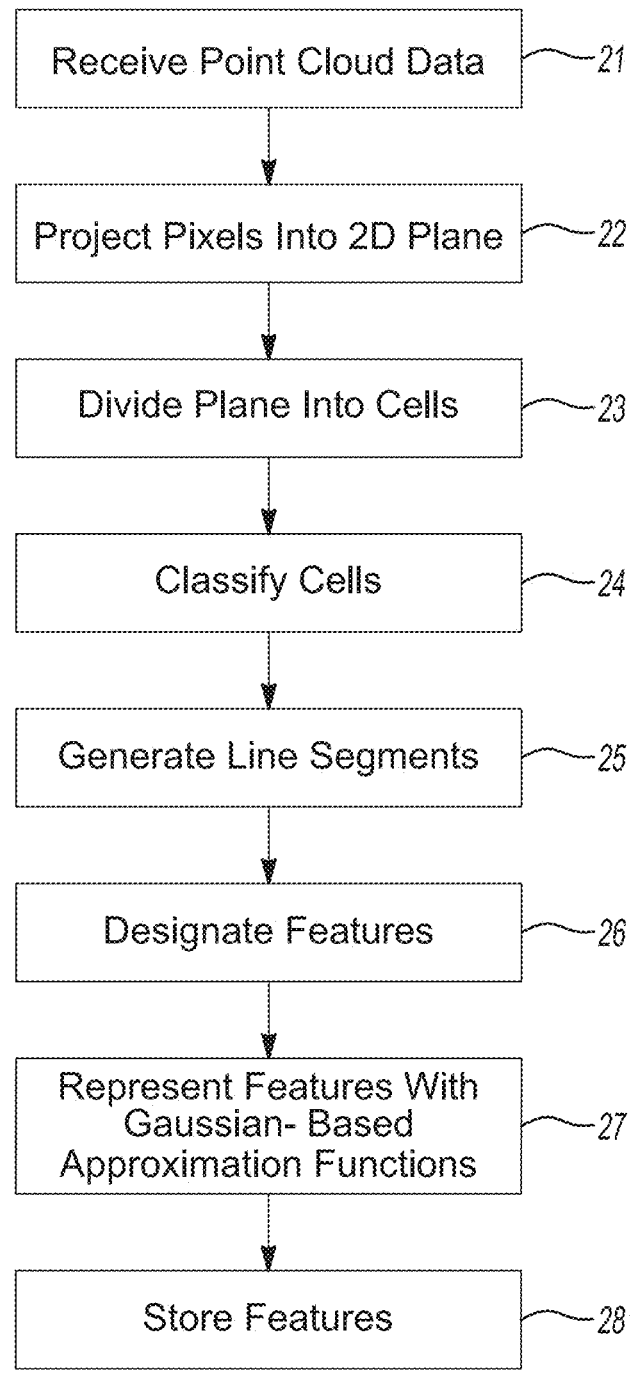
FIG. 2 is a flowchart depicting a method for constructing a 2D feature likelihood map.

FIG. 2 depicts an example method for constructing a two-dimensional feature likelihood map. Point cloud data is received at 21 for a scene of interest. A feature map is automatically created from the HD 3D point cloud map. For illustration purposes, the 3D point cloud map data used in this disclosure was collected by a mobile mapping system from a third party equipped with a 32-row LiDAR, a very precise GNSS, IMU and several cameras with an algorithm similar to GraphSLAM which is described by S. Thrun et. al. in "The Graph SLAM Algorithm with Applications to Large-Scale Mapping of Urban Structures" Int. J. Robot vol. 25, no. 5-6, 2006. The resolution of the raw point cloud map data is usually more than 400 points/m².

The first step is to project the pixels in the point cloud into an x-y plane as indicated at 22, where the x-y plane is substantially parallel with ground in the scene and the x-y plane is divided into an array of cells. More specifically, points are rasterized into small cells on the x-y plane with resolution of r by r, where a cell $c_i$ can be represented using a vector: $c_i = \{P_{ci}, N_{ci}\}$ and $P_{ci}$ represents the point set located within this cell, and $N_{ci}$ is the number of points in $P_{ci}$. From experience, a resolution should be at most 0.2 m by 0.2 m to obtain centimeter level accuracy in localization although differing resolutions fall within the scope of this disclosure.

Before projecting the pixels into the x-y plane, ground pixels may be removed from the point cloud data. That is, a first set of pixels are extracted from the point cloud data, where the pixels in the first set of pixels represent the ground in the scene. In one example, the points above the ground plane are extracted from the point cloud using Cloth Simulation Filter. Other techniques for extracting ground pixels are also contemplated by this disclosure.

Next, features are extracted from the rasterized point cloud data. To do so, cells in the array are classified at 24 as potential feature candidates or not. Landmark features are typically tall vertical features above the ground plane, which leads to the fact that the cells containing landmark features would comprise more points when compared to other cells.

Hence, cells $c_i$ are filtered, such that $N_{ci} < N_t$, where $N_t$ is a threshold that is a function the original point cloud density and the resolution of rasterizations. That is, a given cell in the array of cells is classified as a potential feature candidate when number of points in the given cell is greater than a predefined threshold. Cells classified as potential feature candidates form a 2D feature map.

Cells classified as potential feature candidates, when in close proximity to each other, may be connected with line segments 25. Line segments can be generated using different techniques including but not limited to a Random Sample Consensus (RANSAC) method or Hough transform. The line segments are then designated at 26 as a feature in the scene. In the example embodiment, a line segment is designated as one of a curb feature, a planar feature or a pole feature. Extracting each of these three features is further described below.

Planar features and curb features can be described as a set of connected line segments in 2D. In one example embodiment, planar features and curb features are extracted by using Random Sample Consensus (RANSAC) or Hough Transform. From the feature candidates extracted from the previous step, the planar and curb features would be clustered to form line segments pattern. Thus line detection and regression methods can be used to build planar and curb features. For pole features, since the radius of most pole features in urban and suburban environments is less than 20 cm, it can be approximately modeled as a point in 2D. By applying 2D point clustering and calculating the center of the cluster, pole features can be extracted automatically from the feature map. Other techniques for extracting these feature types are also envisioned by the disclosure. In other embodiments, the line segments may be designated as a particular feature type by a person using an interface to the computing system.

For traditional point-cloud registration-based localization, the real-time LiDAR scan is matched to a point-cloud map through a point-to-point matching process. However, in order to perform feature matching effectively, the feature map built in the manner described above is preferably converted into feature likelihood map (FLAME map) as indicated at step 27. Each feature in the scene is represented with an approximation function. In one example, the features are represented using a Gaussian-based approximation model or a Gaussian mixture based model. More specifically, the features for each class are represented by Gaussian-based approximation functions (e.g., a normal distribution). In a more general sense, the feature likelihoods may be modeled with a weight, a mean and covariance. Other types of approximation functions also fall within the broader aspects of this disclosure.

In the example embodiment, the Gaussian function assigned to a given feature, along with a global coordinate for the given feature, is stored for each feature at 28 in a non-transitory data store, thereby constructing a feature likelihood (FLAME) map of the scene. In one embodiment, the global coordinates are universal Transverse Mercator (UTM) coordinates although other types of coordinates such as the North-Up coordinate system are also contemplated by this disclosure. Compared to a feature vector map, the feature likelihood map can better emulate the original point cloud map. Under FLAME, Gaussian-based likelihood field functions can be treated as the generative process for the actual points from the landmark features in the original point cloud map.

In an example embodiment, the parameters for each Gaussian-based likelihood field are calculated as follows.

Figure 3:
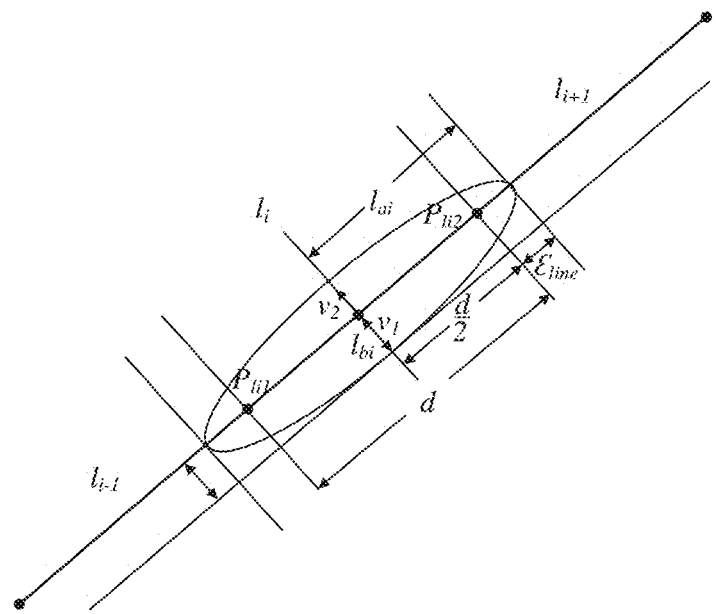
FIG. 3 is a diagram showing the calculation of a mean value $\mu_i$ and covariance $cov_i$ for the likelihood field of line segment $l_i$, the ellipse is the 99% confidence ellipse generated from a Gaussian function.

For planar features modeled as connected line segments in the feature vector map, the connected line segments are divided into smaller line segments of length d. A Gaussian function is used to model each line segment $l_i$ as a likelihood field with a mean value $\mu_i$ and a covariance matrix $cov_i$. The mean value $\mu_i$ is the center point of this line segment. The calculation of $cov_i$ is as follows. First, as shown in FIG. 3, assuming there is a 99% confidence ellipse for N ($\mu_i$, $cov_i$) along this line segment, i.e. $\mu_i$ is the center of the confidence ellipse, the line segment direction is the major axis direction. The underlying meaning of this confidence ellipse is that 99% of the points generated by the Gaussian function N (x; $\mu_i$, $cov_i$) would located within this ellipse. The length of the major axis $l_{ai}$ and minor axis $l_{bi}$ of the confidence ellipse would be as follows:

$$l_{ai} = 2\sqrt{s \cdot \lambda_1} = 2\left(\frac{d}{2} + \varepsilon_{line}\right) \quad (1)$$

$$l_{bi} = 2\sqrt{s \cdot \lambda_2} = 2\left(\frac{\frac{d}{2} + \varepsilon_{line}}{10}\right) \quad (2)$$

where s is the 99% Chi-Square likelihood with 2 degrees of freedom, $\lambda_1$ and $\lambda_2$ are the larger and smaller eigen value of the covariance matrix $cov_i$, respectively. $\varepsilon_{line}$ is the uncertainty factor. Therefore, $\lambda_1$ and $\lambda_2$ can be calculated from equations (1) and (2). The positive direction of the major and minor axis of the confidence ellipse would be the same as the direction of the eigenvector corresponding to $\lambda_1$ and $\lambda_2$, respectively. Therefore, one can build the unit eigenvectors $v_1$ and $v_2$ according to the line segment direction. As shown in FIG. 3, $v_1$ would point to the same direction as this line segment while $v_2$ would be vertical to $v_1$. So, for a line segment $l_i$, the corresponding likelihood field modeled by Gaussian function N (x; $\mu_i$, $cov_i$) can be calculated as follows:

$$\mu_i = \frac{(p_{li1} + p_{li2})}{2} \quad (3)$$

$$cov_{l_i} = V \cdot D \cdot V^{-1} \quad (4)$$

$$V = [v_1 \ v_2], D = \begin{bmatrix} \lambda_1 & 0 \\ 0 & \lambda_2 \end{bmatrix} \quad (5)$$

where $p_{li1}$ and $p_{li2}$ are the end points of line segment $l_i$. V is the orthonormal eigenvector matrix.

For curb features, one can use the same processing method because curb features are also represented as connected line segments in the feature vector map. The only difference is that a larger uncertainty factor $\varepsilon_{curb}$ is used. This is the case since when compared to walls, fences and building facades, curbs are much lower to the ground and usually not strictly vertical to the ground, and this would result in a larger uncertainty.

Poles are represented as points in the feature vector map, and their feature likelihoods are modeled by Gaussian function N (x; $\mu_{pole_j}$, $cov_{pole_j}$):

$$\mu_{pole_j} = \text{coordinate of pole}_j \quad (6)$$

$$cov_{pole_j} = \begin{bmatrix} var(x) & 0 \\ 0 & var(y) \end{bmatrix} \quad (7)$$

-continued $$\text{var}(x) = \text{var}(y) = \frac{r^2}{s} \quad (8)$$

where r represents the radius of the confidence circle, s is the 99% Chi-Square likelihood with 2 degrees of freedom. If the radius of the pole is provided, r in this equation can be changed into $r_{polej}+\varepsilon_{pole}$, where $r_{polej}$ is the radius of the pole and $\varepsilon_{pole}$ is the uncertainty factor.

Figure 4:
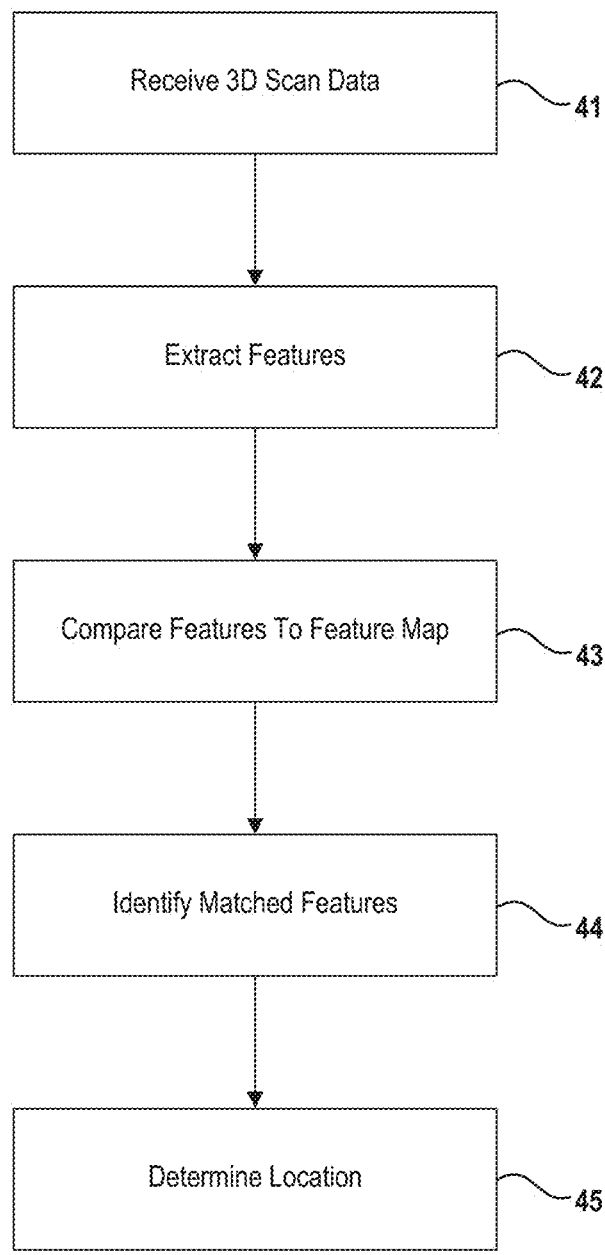
FIG. 4 is a flowchart depicting a method for determining location of a movable object.

Another goal of this disclosure is localization of a vehicle or moving object. A computer-implemented method for determining location of a vehicle is described briefly in relation to FIG. 4. In an example embodiment, the vehicle is equipped with a 3D scanner or other imaging device. In this way, three-dimensional scan data of a scene surrounding the vehicle is received as indicated at 41.

One or more features are extracted at 42 from the three-dimensional scan data. Rather than directly matching 3D LiDAR feature points to the feature map, the LiDAR feature points are first transformed into feature maps themselves and then aligned for ego localization. This has the advantages of improved association with fewer ambiguities as well as reduced computation, while simultaneously maintaining high accuracy. Feature detectors for planar features, curb features and pole features are further described below.

Next, the extracted features from the three-dimensional scan data are compared at 43 to the features in the feature likelihood map. From the set of matched features, a subset of features is identified at 44, where the features in the subset of features are those features closest in proximity to the vehicle. In the example embodiment, the three closest matched features are used although using more or fewer features is contemplated.

Lastly, the location of the vehicle is determined using the subset of features. It is to be understood that only the relevant steps of the methodology are discussed in relation to FIG. 4, but that other software-implemented instructions may be needed to control and manage the overall operation of the system.

Finding features in a single LiDAR scan differs from feature detection in a dense pre-scanned point cloud due primarily to the drop in resolution with range from sensor. Feature detectors are designed to operate at a broad range of resolutions, including low sampling resolution.

In the example embodiment, scan data may undergo pre-processing. LiDAR points can be initially filtered to obtain surface normal and are categorized as ground, steep and other. Surface normals are estimated from neighboring pixels in a depth image as described in by D. D. Morris in "Obstacles and Foliage Discrimination using Lidar" Unmanned Systems Technology XVIII, 2016, vol. 9837 which is incorporated in its entirety. These normals provide a steepness measure for pixels; those close to vertical (within 12.5 degrees) are labeled steep pixels, and are used to gather evidence for pole and planar features. Any appropriate ground detection method could also be used to label ground pixels.

Figure 5:
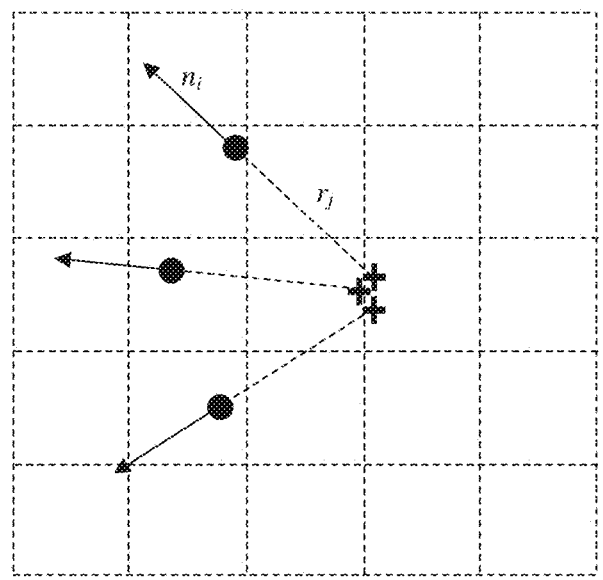
FIG. 5 is a graph illustrating evidence gathering for pole detection, in this case radius $r_i$.

For detecting pole features, the LiDAR scan is first divided into a regular array of cells of size Xm. Within each cell, evidence for a pole and its location is gathered. Poles are modeled as vertical cylinders with LiDAR pixels distributed on the surface of the pole and with normal vectors that point away from the pole center and within 90 degrees of the sensor. Pole parameters, $\theta_{pole}=(x_j, y_j, r_j)$, are its center location and radius. Assuming a cell contains a pole, a LiDAR pixel with location $x_i$ in a cell and normal $n_i$ can predict a pole center as illustrated in FIG. 5. This prediction $P(x_i,n_i|T_{pole},\theta_{pole})$, can be modeled as Gaussian centered at the pole center, and sampled over grid centers.

If the cell is not a pole cell, then model $P(x_i,n_i|T_{nonpole})$ as a uniform density over grid centers equal to $$\frac{1}{n_g},$$

where $n_g$ is the number or grid elements in each cell.

Assuming independent pixel samples, one can solve for the maximum likelihood ratio of pole to nonpole, $MLR_{pole}$ ($\theta_{pole}$) using a probabilistic Hough transform. This maximizes the following expression over pole locations and radii:

$$MLR_{pole}(\theta_{pole}) = \underset{\theta_{pole}}{\text{argmax}} \; n_g^n \prod_{i=1}^{N_s} P(x_i, n_i \mid T_{pole}, \theta_{pole}) \quad (9)$$

Here, $N_s$ is the number of steep pixels, and N is the number of non-ground pixels. The result is a pole estimate for each cell along with a likelihood of ratio for a pole existing there. A threshold on this likelihood ratio is determined discriminatively.

Likewise, planar features are detected using an array of cells distributed over the LiDAR scan. In each cell, a planar feature is modeled as a set of steep pixels with normals having the same orientation in the horizontal plane, $\theta_{wall}$. Non-planar features are modeled as having uniform normal orientation. Once again a probabilistic Hough transform solves for the maximum likelihood ratio of wall to non-wall analogous to equation (9), along with a wall orientation $\theta_{wall}$. Further details for this method can be found in "Obstacles and Foliage Discrimination using Lidar" Unmanned Systems Technology XVIII, 2016, vol. 9837 which is incorporated in its entirety.

Curbs are another class of common and important features that are readily observable by moving vehicles. Based on the geometry and topology of the curb features around the vehicle, they can provide reliable constraints in the lateral direction. There are many known curb detection algorithms which are suitable for use in this disclosure. In some case, these detection methods are computationally expensive, and work best with a combination of high-resolution 3D LiDAR and other sensors. This disclosure proposes a new light-weight curb detection method, which can be used for any resolution LiDAR.

As proof of concept, the proposed detection method was implemented using a low-resolution LiDAR that returns a point cloud formed by 16 concentric measurements, which is referred to as rings. Further, the LiDAR is mounted on the top of the vehicle and parallel to the ground. If the height is fixed, for empty flat ground, the distance between each consecutive ring can be determined. Points where consecutive rings are closer than this are candidates for being curbs.

Figure 6:
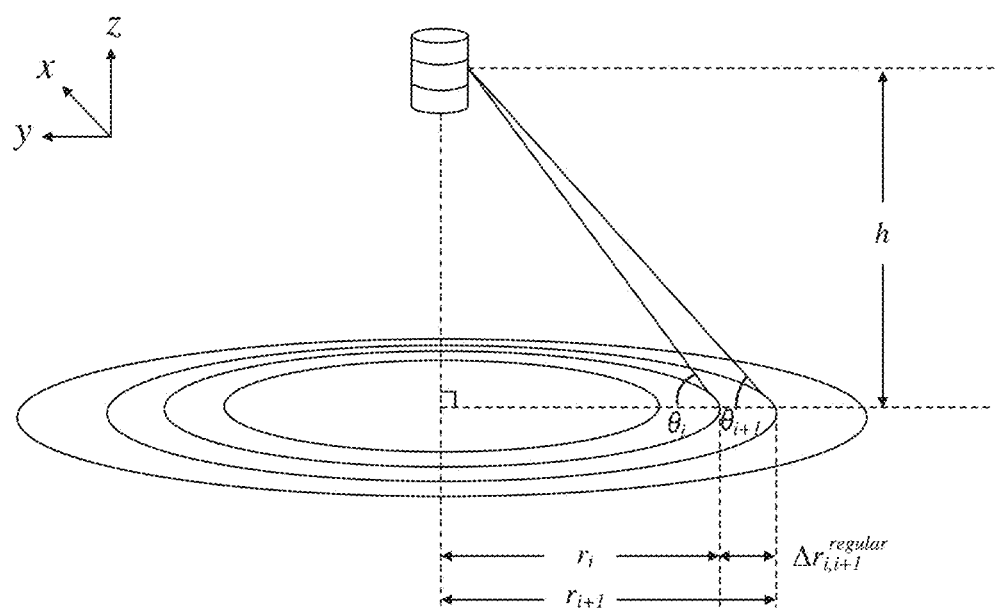
FIG. 6 is a diagram of a scenario where 3D LiDAR beams intersect a flat plane.

With reference to FIG. 6, the distance between rings for flat ground is computed. The ith ring radius is:

$$r_i^{regular} = \frac{h}{\tan \theta_i} \quad (10)$$

where h is the LiDAR height relative to the flat ground and $\theta_i$ is the laser beam angle. The distance between ring i and i+1 is:

$$\Delta r_{i,i+1}^{regular} = r_{1+1} - r_1, \ 0 < i < n-1 \quad (11)$$

Additional factors influence the distance between consecutive rings including non-flat ground and the LiDAR is not being mounted exactly parallel to the ground. To accommodate these, one can define an interval:

$$d_{i,i+1} = [a\Delta r_{i,1+1}^{regular}, b\Delta r_{i,i+1}^{regular}], \quad (12)$$
$$0.5 < a < b < 1$$

where a and b are parameters that adjust the range bounds. Points with $\Delta r_{i,i+1}$ falling within $d_{i,i+1}$ are categorized as curb candidates.

To avoid misclassifying sloped regions as curbs, one can develop the following strategy. Observe that gradient provide useful cue: curbs typically have a large height variance in lateral direction (y direction) and low height variance in longitudinal direction (x direction). To quantify this, the LiDAR scan is placed in an n by m cell grid, where n is the number of rings and each row i stores a ring. Each cell grid $c_{i,j}$ stores the mean value of the position of points that fall in $c_{i,j}$. Therefore, the gradient is calculated as follows:

$$g_{i,j} = \frac{z_{i,j+1} - z_{i,j-1}}{dist_{x,y}(c_{i,j+1}, c_{i,j-1})} \quad (13)$$

where $z_{i,j}$ is the z value of the element in the ith row and jth column in the cell grid, $dist_{x,y}$ (a, b) represents the Euclidean distance between a and b in x-y plane. For each grid $c_{i,j}$, compute $g_{i,j}$ and compare it with a threshold $t_g$ to classify it as a curb candidate or not. Finally, based on the ground segmentation depicted in the previous subsection, only points classified both as ground and curb are classified as curb points.

FIG. 7 further depicts a proposed localization method for determining the location of a moving object or vehicle. A feature likelihood map of a scene is received as indicated at 71. As described above, each feature in the feature map includes a Gaussian function representing a given feature, its covariance, and coordinates for the feature in a two-dimensional coordinate system representing the scene. It is understood that the feature map is stored in a computer memory accessible to the processor implementing the localization method.

Three-dimensional scan data of the scene surrounding the moving object is captured by an imaging device, for example a 3D scanner integrated with or on the moving object. The three-dimensional scan data is received at 72 from the imaging device. Features are then extracted at 73 from the three-dimensional scan data. In one embodiment, all of the extracted features are processed together collectively. In other embodiments, features are classified into one of a predefined set of feature types. Feature types in the set of feature types may include but are not limited to curb feature, planar feature and pole feature. Feature types are processed separately before combining to form an overall alignment score as will be further described below. Different techniques for extracting features from scan data are readily found in the art.

Next, the current state of the moving object in the 2D coordinate system associated with the feature map is predicted at 74 using the previous motion state and a motion model. The predicted current state provides an initial guess to initialize the remainder of the iterative alignment process.

For each of the extracted features, a distance score is computed at 57. The distance score provides a distance between a given feature and a select number N of features in the feature map having the closest proximity to the location of the given feature in the 2D coordinate system. In one embodiment, the distance score is computed based on a Mahalanobis distance although other types of distance measures (e.g., Euclidean distance) are contemplated by this disclosure. An example method for computing a distance score for a feature is further described below in relation to FIG. 8.

The distance score for the extracted features are summed at 76, thereby yielding an (overall) alignment score. Lastly, the location of the moving object can be determined by minimizing the alignment score. In one example, Newtons method is used to minimize the alignment score although other optimization techniques fall within the scope of this disclosure. In any case, an iterative approach is applied until a stopping condition is met. In one embodiment, the stopping condition is met when the value of the alignment score is less than a predefined score threshold or the number of iterations exceeds the predefined iteration threshold.

FIG. 8 illustrates an example method for computing a distance score for a given feature. To do so, a location for a given feature is transformed from a coordinate system associated with the 3D scanner to a location in the 2D coordinate system associated with the feature map as indicated at 81. N features in the feature map having the closest proximity to the given feature are selected at 82. In one example, three (3) closest features are selected although more or fewer features are contemplated by this disclosure. In the case features are classified by feature type, the selected N features are of the same feature type as the given feature.

A distance score is computed at 83 between the given feature and each of the selected N features. In the example embodiment, the distance score is based on a Mahalanobis distance as described below. In a simplified embodiment, the distance scores for each of the N selected features are summed together at 84 to yield a distance score of the given feature. The distance scores for each of the features are in turn summed to yield an overall alignment score. In the case features are classified by feature type, distance scores for features belong to the same feature type are summed together to yield a feature type score and then the feature types scores are summed to yield the overall alignment score.

Below is an example embodiment of an algorithm that implements this proposed localization method. The two key components of this algorithm are feature association and feature alignment. The algorithm leverages the three feature types described above: pole, planar and curb.

In this example, the state of the system is defined as $X_t=(x_t, y_t, \theta_t)^T$, a three-parameter pose in two dimensions. $z_t^{pole}$, $z_t^{planar}$ and $z_t^{curb}$ stand for the detected pole, planar and curb feature points from the LiDAR scan at time t. FLAME_map represents the feature (FLAME) map. The feature map contains N4 feature likelihood fields. In particular, each map feature likelihood field $m_i$ encompasses the class name, mean value $\mu_i$ and the covariance matrix $cov_i$.

For motion prediction, $v_t^m$ and $\theta_t^m$ are the measured vehicle linear speed and heading angle at time stamp t from odometry and IMU. The motion model for predicting the current state of the moving object is shown at line 2 of the algorithm, where linear vehicle speed is $v_t^m$, heading angle is $\theta_t^m$ and T is the sampling period. The motion model is only used for providing the initial guess to initialize the iterative alignment.

---

Algorithm of Multiclass Based Association And Alignment

---

Variables:
$z_t^{pole} = \{p_1^{pole}, p_2^{pole}, \ldots, p_{N1}^{pole}\}$,
$z_t^{planar} = \{p_1^{planar}, p_2^{planar}, \ldots, p_{N2}^{planar}\}$,
$z_t^{curb} = \{p_1^{curb}, p_2^{curb}, \ldots, p_{N3}^{curb}\}$,
$p_i^{class} = \{x_i^{class}, y_i^{class},\}$,
class = pole', 'planar', 'curb'},
FLAME_map = $\{m_1, m_2, m_3, \ldots, m_{N4}\}$
$m_i$ = {class, $\mu_i$, $cov_i$}
$X_{t-1} = (x_{t-1}, y_{t-1}, \theta_{t-1})^T$ $$\hat{X}_t = \begin{bmatrix} \hat{x}_t \\ \hat{y}_t \\ \hat{\theta}_t \end{bmatrix} = \begin{bmatrix} x_{t-1} = v_t^m \cdot T \cdot \cos\theta_t^m \\ y_{t-1} = v_t^m \cdot T \cdot \sin\theta_t^m \\ \theta_t^m \end{bmatrix} \text{ \% Motion Prediction}$$

while not converged do:
  for each c in class
    $score^c \leftarrow 0$
    $g^c \leftarrow 0$
    $H^c \leftarrow 0$
    for all transformed detected c featurepoints
      $Trans(\hat{X}_t, p_i^c)$
      do kd search with radius ≤ r to find the top 3 closest features in likelihood_map with class == c
      Update the negative score s (see equation (14))
      $score^c \leftarrow score^c + s$
      $p_t' = Trans(\hat{X}_t, p_i^c) - \mu_j$
      Update the k the element for the gradient vector (see equation (15))
      $g_k \leftarrow g_k + g_k'$
      Update the a th row, b th column element in Hessian Matrix (see equation (16))
      $H_{ab} \leftarrow H_{ab} + H_{ab}'$
    end for
  end for
  $score^{all} = score^{pole} + score^{planar} + score^{curb}$
  $g^{all} = g^{pole} + g^{planar} + g^{curb}$
  $H^{all} = H^{pole} + H^{planar} + H^{curb}$
  solve $H^{all} \cdot \Delta \hat{X}_t = -g^{all}$
  $\hat{X}_t \leftarrow \hat{X}_t + \Delta \hat{X}_t$
end while
return $X_t \leftarrow \hat{X}_t$

---

The iterative alignment process is depicted in lines 3-25. Taking pole class feature as example (in line 9, where c equals 'pole'), for a transformed pole feature point Trans $(\hat{X}_t, p_i^{pole})$, the correspondence is determined by finding the top 3 closet pole feature likelihood fields in the map. Trans(X,p) is defined as a transformation function that transforming a point p by pose X. $\hat{X}_t$ contains motion prediction error, and hence, associating Trans$(\hat{X}_t, p_i^{pole})$ to the closest map pole feature likelihood field may not be correct. However, among the top three closest map pole feature likelihood fields, the probability of containing the correct correspondence would be much higher. Therefore, the strategy is to find all the potential correspondences and optimize them together. If fewer than three pole feature likelihood fields are found, only those are used. If no pole feature likelihood field is found in the neighborhood, then the algorithm drops this detected pole point in this iteration; since it may be a false positive. This strategy also makes the system robust to dynamic moving objects that are not modeled in the map. For example, passing vehicles that may be detected as planar features should not be associated to any feature likelihood field in the FLAME map.

Then the negative score is calculated and updated in lines 10-11 by adding the negative scores of all transformed detected points. Here, the negative score is defined as follows:

$$s = \Sigma_j^3 - \exp\left(-\frac{1}{2}\left(Trans(\hat{X}_t, p_i^{pole}) - \mu_j\right)^T \cdot cov_j^{-1} \cdot \left(Trans(\hat{X}_t, p_i^{pole}) - \mu_j\right)\right) \quad (14)$$

where $\mu_j$ and $cov_j$ are the mean value and covariance matrix of the pole feature likelihood field corresponding to Trans $(\hat{X}_t, p_i^{pole})$.

Lines 13-16 illustrate the process of updating gradient vector and Hessian matrix regarding the pose vector $\hat{X}_t$. The kth element for the gradient vector can be calculated as follows:

$$g_k' = \frac{\partial s}{\partial(\hat{X}_t)_k} = d_1 \cdot d_2 \cdot p_t'^T \cdot cov_j^{-1} \cdot \frac{\partial p_t'}{\partial(\hat{X}_t)_k} \cdot \exp\left(-\frac{d_2}{2} \cdot p_t'^T \cdot cov_j^{-1} \cdot p_t'^T\right) \quad (15)$$

The ath row, bth column element in Hessian matrix can be calculated as follows:

$$H_{ab}' = \frac{\partial^2 s}{\partial(\hat{X}_t)_a \partial(\hat{X}_t)_b} = d_1 \cdot d_2 \cdot \exp\left(-\frac{d}{2} \cdot p_t'^T \cdot cov_j^{-1} \cdot p_t'^T\right) \cdot \quad (16)$$

$$\left(-d_2\left(p_t' \cdot cov_j^{-1} \cdot \frac{\partial p_t'}{\partial(\hat{X}_t)_a}\right) \cdot \left(X_t' \cdot cov_j^{-1} \cdot \frac{\partial p_t'}{\partial(\hat{X}_t)_b}\right) + \right.$$

$$\left. p_t'^T \cdot cov_j^{-1} \cdot \frac{\partial^2 p_t'}{\partial(\hat{X}_t)_a \partial(\hat{X}_t)_b} + \frac{\partial p_t'}{\partial(\hat{X}_t)_b}^T \cdot cov_j^{-1} \cdot \frac{\partial p_t'}{\partial(\hat{X}_t)_a}\right)$$

For detected planar points and curb points, the same computation is executed (line 4 when c equals 'planar' and 'curb'). Note that in the proposed framework, the search for correspondence is constrained to the same class of features; for example, the detected curb feature points can only be associated with the curb feature likelihood fields in the map. This multiclass-based association significantly reduces false alignments. The negative score, gradient vector and Hessian matrix are calculated based on their classes separately, but these variables are all parameterized with respect to the estimated vehicle pose state $\hat{X}_t$; and hence, the algorithm searches for the optimum parameter values. Newton's method is used to minimize the total negative score function (lines 19-23).

In order to reduce the complexity of the system, the proposed architecture focuses on three-parameter pose estimation (2D position and orientation) since this is sufficient for most of urban and suburban autonomous driving environments. Vehicles are always driven on the ground surface and it is assumed that the ground elevation does not change dramatically nearby.

For proof of concept, the experimental platform used in this study is a modified, drive-by-wire Lincoln MKZ. The vehicle is equipped with a Velodyne PUCK (VLP-16) 16 lines LiDAR, and a NovAtel PwrPak7 GNSS Inertial Navigation System to collect the near-ground truth data with an error of 2-3 cm for analysis. A Core i7 CPU runs Ubuntu and Robot Operating System (ROS).

Two test sites, representative of typical suburban environments, are included in this study. Test site #1 is a 62000 m² purpose-built proving ground for testing autonomous vehicles. Test site #2 is a real suburban environment.

In order to evaluate the performance of the proposed localization framework, the vehicle was driven for several loops with different speeds in the test sites and evaluated the position estimation by comparing the proposed method with traditional 3D point cloud registration based localization (NDT driven) and other related methods. FIG. 9 shows the comparison of position estimation mean absolute error (MAE) and orientation MAE error between the proposed method and other methods. Two types of experiments were performed. One is an overall localization experiment; the second is a single-step alignment experiment. For overall localization, it is a recursive algorithm, the current state $X_t$ is updated from the previous state $X_{t-1}$. In the single-step alignment experiment, the current state $X_t$ is updated from the previous ground truth state. For some of the other methods, they have relatively large errors in each step of the alignment and consequently, the accumulative error for each step would make the recursive algorithm fail and impossible to evaluate quantitively. Using the previous ground truth to initialize the update would keep the algorithm running and make it feasible to evaluate and compare the error in each single step of the alignment for the whole route. The error for position estimation is defined as the Euclidean distance between the position estimation and the near-ground truth. The orientation error is defined as the absolute difference between the estimated yaw angle and the near-ground truth yaw angle. FIG. 9 further shows that the proposed method can achieve centimeter-level localization accuracy and same level of performance as the traditional 3D point cloud registration based method. Performance was good even for road segments when only two of the three feature classes were observed.

The table below shows the comparison of the size for the two types of maps. The proposed FLAME map uses far less memory and computation than a traditional point cloud map. 3D point cloud map with resolution of 121 points/m² could achieve the best localization performance using Velodyne VLP-16. This result illustrates that for localization applications, many of the rich details in 3D point cloud maps contribute little to improving localization accuracy, and can be efficiently encoded as class labels for feature likelihoods.

TABLE

Comparison of the Size Between Proposed FLAME Map and 3D Point Cloud Map

| Map Type | | Test Site #1 (62000 m²) | Test Site #2 (181000 m²) |
|---|---|---|---|
| FLAME MAP | | 210.1 kB | 730 kB |
| 3D Point Cloud Map | 36 points/m² | 35.4 MB | 87.6 MB |
| | 121 points/m² | 152.3 MB | 230.2 MB |
| | 400 points/m² | 403.3 MB | 580.0 MB |

Figure 10:
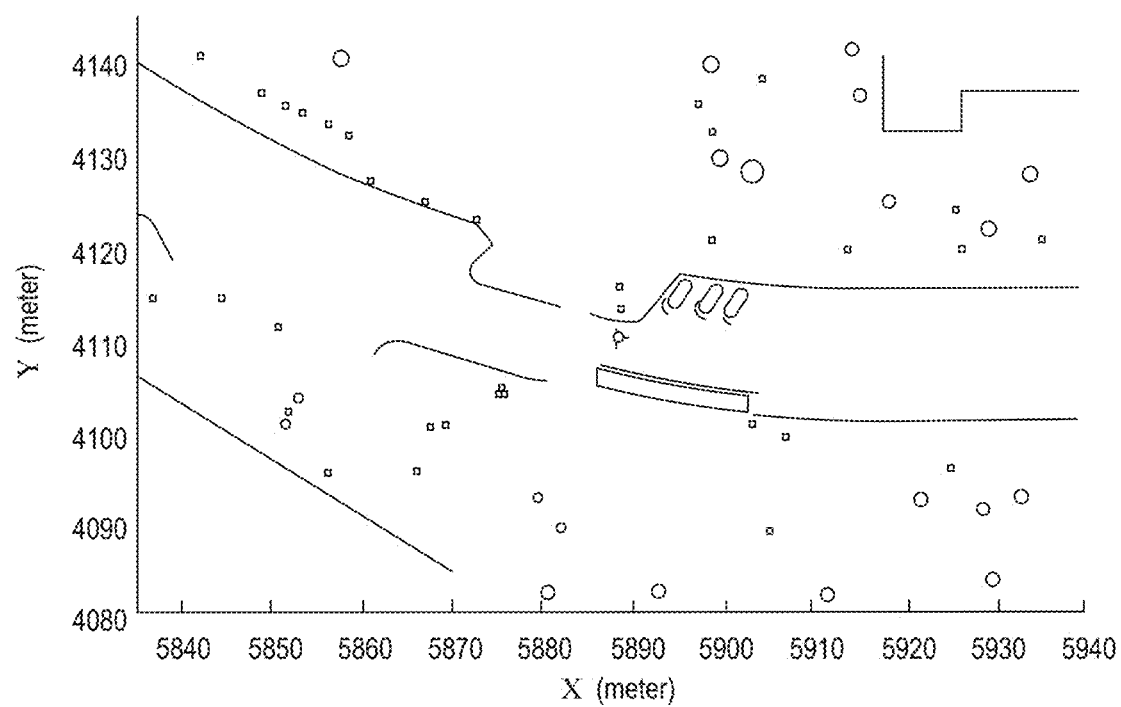
FIG. 10 is a graph showing the localization result when there are dynamic and static objects that are not included in the map.

The use of multi-class features that are associated and aligned within class is advantageous when features are in close proximity. This is particularly the case when maps are projected into a 2D plane. Ignoring class can lead to incorrect associations. FIG. 10 compares the proposed multi-class based association alignment with non-class based alignment. This illustrates how non-class based alignment results in curb features being miss-associated with planar-features on walls. On the other hand, multi-class features avoid this issue leading to improved alignment.

For map-based localization algorithms, environmental changes, which are not modeled in the prior map, can affect localization performance. The measured LiDAR points from the side of the bus are detected as planar features. The huge bus also blocks the field of view behind it, so the features behind it cannot be detected. Despite this, the proposed multiclass based association alignment framework works well as no features are associated with the bus features.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for determining location of a moving object in a scene, comprising:
    receiving a feature map of the scene, where each feature in the feature map includes coordinates for the feature in a two-dimensional (2D) coordinate system representing the scene;
    receiving, from a 3D scanner, three-dimensional scan data of a scene surrounding the moving object;
    extracting two or more features from the three-dimensional scan data;
    receiving a previous motion state for the moving object, where the motion state includes coordinates of the moving object in the 2D coordinate system associated with the feature map;
    predicting a current state of the moving object in the 2D coordinate system associated with the feature map using the previous motion state and a motion model;
    for each feature in the two or more features, computing a distance score by
    a) transforming a location for a given feature in the two or more features from a coordinate system associated with the 3D scanner to a location in the 2D coordinate system associated with the feature map;
    b) selecting N features in the feature map having closest proximity to the location of the given feature in the 2D coordinate system;
    c) computing a distance score between the given feature and each of the selected N features;
    d) summing the distance scores between the given feature and each of the selected N features to yield a distance score for the given feature;
    summing the distance scores for each of the two or more features to yield an alignment score; and
    determining location of the movable object in the 2D coordinate system associated with the feature map by minimizing the alignment score.

2. The method of claim 1 further comprises capturing the three-dimensional scan data using the 3D scanner, where the 3D scanner is integrated with the moving object.

3. The method of claim 1 wherein each feature in the feature map is represented with a Gaussian function and the distance score between the given feature and each of the selected N features is computed based on a Mahalanobis distance.

4. The method of claim 1 further comprises minimizing the overall alignment score over multiple iterations until a stopping condition is met.

5. The method of claim 1 further comprises minimizing the overall alignment score using Newtons method.

6. The method of claim 1 further comprises classifying each of the two or more features into one of a predetermined set of feature types;
    for each feature type in the predefined set of feature types, computing a feature type score for a given feature type by
    e) transforming a location for a given feature from a coordinate system associated with the 3D scanner to a location in the 2D coordinate system associated with the feature map, where the given feature has same feature type as the given feature type;
    f) selecting N features in the feature map having closest proximity to the location of the given feature in the 2D coordinate system, where the selected N features are same feature type as the feature type of the given feature;
    g) computing a distance score between the given feature and each of the selected N features;
    h) summing the distance scores for each of the selected N features to yield a distance score for the given feature;
    repeating steps e)-h) for each of the features belonging to the given feature type and summing the distance scores for each of the features belonging to the given feature type to yield a feature type score;
    summing the feature type scores for each of the feature types in the predefined set of feature types to yield an overall alignment score; and
    determining location of the movable object in the 2D coordinate system associated with the feature map by minimizing the overall alignment score.

7. The method of claim 6 wherein the feature types in the predetermined set of feature types is selected from a group consisting of a curb feature, a planar feature and a pole feature.

8. The method of claim 1 further comprises controlling movement of the moving object using the location of the movable object.

9. A computer-implemented method for determining location of a moving object in a scene, comprising:
    receiving a feature map of the scene, where each feature in the feature map includes coordinates for the feature in a two-dimensional (2D) coordinate system representing the scene;
    receiving, from a 3D scanner, three-dimensional scan data of a scene surrounding the moving object;
    extracting two or more features from the three-dimensional scan data, where each of the two or more features is classified into one of a predefined set of feature types;
    receiving a previous motion state for the moving object, where the motion state includes coordinates of the moving object in the 2D coordinate system associated with the feature map;
    predicting a current state of the moving object in the 2D coordinate system associated with the feature map using the previous motion state and a motion model;
    for each feature type in the predefined set of feature types, computing a feature type score for a given feature type by i) transforming a location for a given feature from a coordinate system associated with the 3D scanner to a location in the 2D coordinate system associated with the feature map, where the given feature has same feature type as the given feature type;
j) selecting N features in the feature map having closest proximity to the location of the given feature in the 2D coordinate system, where the selected N features are same feature type as the feature type of the given feature;
k) computing a distance score between the given feature and each of the selected N features;
l) summing the distance scores for each of the selected N features to yield a distance score for the given feature;
repeating steps a)-d) for each of the features belonging to the given feature type and summing the distance scores for each of the features belonging to the given feature type to yield a feature type score;
summing the feature type scores for each of the feature types in the predefined set of feature types to yield an overall alignment score;
determining location of the movable object in the 2D coordinate system associated with the feature map by minimizing the overall alignment score.

10. The method of claim 9 further comprises capturing the three-dimensional scan data using the 3D scanner, where the 3D scanner is integrated with the moving object.

11. The method of claim 9 wherein each feature in the feature map is represented with a Gaussian function and the distance score between the given feature and each of the selected N features is computed based on a Mahalanobis distance.

12. The method of claim 9 further comprises minimizing the overall alignment score over multiple iterations until a stopping condition is met.

13. The method of claim 9 further comprises minimizing the overall alignment score using Newtons method.

14. The method of claim 9 wherein the feature types in the predetermined set of feature types is selected from a group consisting of a curb feature, a planar feature and a pole feature.

15. The method of claim 9 further comprises controlling movement of the moving object using the location of the movable object.

\* \* \* \* \*